United States Patent [19]

Walker

[11] 4,428,234

[45] Jan. 31, 1984

[54] PHASE DETECTION LASER ACCELEROMETER

[76] Inventor: Clifford G. Walker, 915 Weatherly Rd., Huntsville, Ala. 35803

[21] Appl. No.: 362,014

[22] Filed: Mar. 25, 1982

[51] Int. Cl.$^3$ ............................................. G01P 15/08
[52] U.S. Cl. .................................... 73/517 R; 73/653
[58] Field of Search .............. 73/517 R, 653, 705, 73/800; 250/227; 350/96.1, 371, 400

[56] References Cited

U.S. PATENT DOCUMENTS

| | | | |
|---|---|---|---|
| 3,039,298 | 6/1962 | Zandman | 73/800 |
| 3,506,362 | 4/1970 | Doyle et al. | 356/111 |
| 3,517,560 | 6/1970 | Jacobs et al. | 73/516 |
| 3,517,982 | 6/1970 | Fonda-Bonardi | 73/517 R |
| 3,800,594 | 4/1974 | Hutchings et al. | 73/516 R |
| 4,155,251 | 5/1979 | Lautzenhiser | 73/141 A |
| 4,163,397 | 8/1979 | Harmer | 73/800 |
| 4,233,847 | 11/1980 | Walker | 73/517 R |

OTHER PUBLICATIONS

Goss et al., "Fiber-Optic Rotation Sensor Technology" from Applied Optics, vol. 19, No. 6, Mar. 15, 1980, pp. 852–858.

Merz et al., "GaAs Integrated Optical Circuits by Wet Chemical Etching" from IEEE Journal of Quantum Electronics, vol. QE-15, No. 2, Feb. 1979, pp. 72–82.

Garmire, "Optical Waveguide for Laser Gyro Applications" from SPIE, vol. 157, Laser Inertial Rotation Sensors, 1978, pp. 95–99.

Leonberger et al., "Low-loss GaAs p$^+$n$^-$n$^+$ three-dimensional optical waveguides" from Applied Physics Letters, vol. 28, No. 10, May 15, 1976, pp. 616–619.

Anderson, "Integrated Optical Spectrum Analyzer: An imminent 'chip'" IEEE Spectrum, Dec. 1974, pp. 22–29.

*Primary Examiner*—James J. Gill
*Attorney, Agent, or Firm*—Robert P. Gibson; Anthony T. Lane; Freddie M. Bush

[57] ABSTRACT

An accelerometer utilizes a laser source, a photoelastic waveguide, a plurality of optical beam paths and detectors for processing optical output energy from the laser along two or more paths for providing phase detection for measuring acceleration. An electronic signal processing section converts the optical signals to electrical signals and provides an output for indicating circuitry. Formed in a micro-optical/integrated optic format, the accelerometer can be packaged in a small volume which allows ready use in systems for guidance or navigation purposes. Light generated by the laser is divided into two or four beam paths. Beam energy is directed through the photo-elastic waveguides and are selectively recombined to set up interference conditions. Subjecting the waveguide to acceleration stress will cause a detectable phase difference to occur which is indicative of acceleration.

6 Claims, 3 Drawing Figures

PHASE DETECTION LASER ACCELEROMETER

DEDICATORY CLAUSE

The invention described herein may be manufactured, used, and licensed by or for the Government for governmental purposes without the payment to me of any royalties thereon.

SUMMARY OF THE INVENTION

A laser accelerometer for phase detection produces an output beam polarized perpendicular to the direction from which acceleration forces to be measured occur. The beam is split, a first part of the beam being directed toward a first detector, and a second part of the beam is directed toward a second detector. The respective beams are further divided and selectively acted upon by a proof mass, after which they are recombined to provide the first and second beam parts. The two beams exit the waveguides and are coupled respectively to the two detectors. An interference condition is established between respective beam portions which are coupled directly to each detector and the beam portions passed through the photoelastic waveguides stressed by the proof mass before being coupled to the respective detectors. The two separate interference conditions are complimentary. The proof mass attached to the photoelastic waveguides is differentially responsive to acceleration forces to stress the waveguides and causes a phase differencebetween the stressed and unstressed waveguide beams. This phase difference is proportional to input acceleration.

DESCRIPTION OF THE PREFERRED EMBODIMENT

Figure 1:
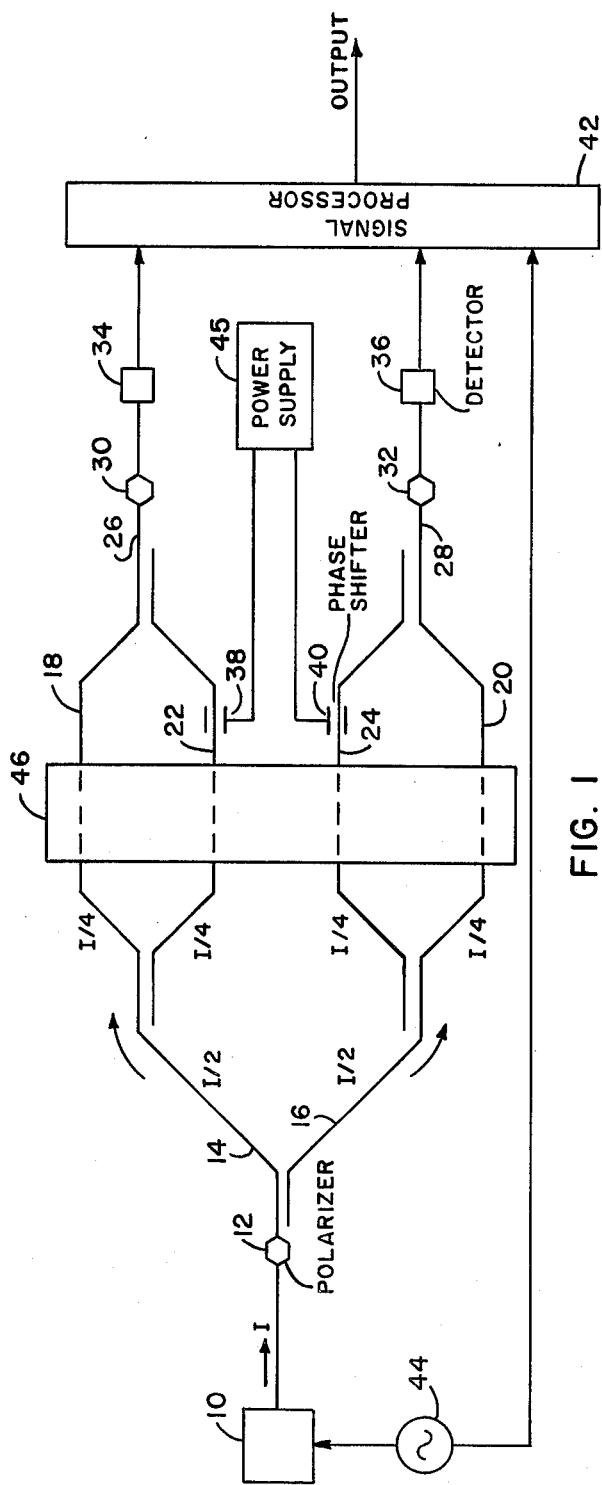
FIG. 1 is a diagrammatic view of the phase detection laser accelerometer using integrated optics and electronics.

Referring now to the drawings wherein like numbers represent like parts, a phase detection laser accelerometer is shown in FIG. 1. Optical portions of the accelerometer comprises a laser diode 10, polarizer 12, waveguides 14 and 16, stressed photoelastic waveguides 18 and 20, unstressed photoelastic waveguides 22 and 24, output waveguides 26 and 28 and polarizers 30 and 32. Electronic portions of the accelerometer include photodetectors 34 and 36 phase bias elements 38 and 40, a signal processor 42 such as a lock-in differential amplifier which provides the output signal, a laser modulator 44 and a power supply 45 for the phase shifters. Output signals from processor 42 may be coupled to any monitoring system such as a visual display or a computer. The laser modulator 44 drives laser 10 and provides a reference signal to processor 42, providing shot-noise-limited operation. A proof mass 46 is mounted on photoelastic waveguides 18 and 20 and responds to acceleration forces to stress these waveguides.

Figure 2:
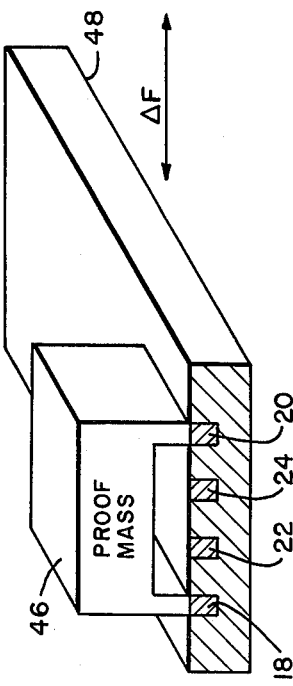
FIG. 2 is a diagrammatic view, cutaway of a waveguide assembly with a proof mass over selected waveguides.

In the diagrammatic view of FIG. 2, a view of a waveguide assembly, a substrate 48 contains optical waveguides 18, 20, 22, and 24 therein with proof mass 46 fixedly attached over guides 18 and 20. Acceleration force $\Delta F$ stresses these waveguides, placing one waveguide in compression and the other in tension depending on the direction of acceleration.

In the monolithic accelerometer structure of FIG. 1 the laser beams are split and added using waveguide-to-waveguide directional coupling (W-W-DC) methods as is well known in the art. The horizontally polarized laser beam from source 10 has an output intensity I and wavelength $\lambda$ which passes through horizontal polarizer 12 to assure that the beam is polarized perpendicular to the stress direction caused by acceleration forces on proof mass 46. After passing through polarizer 12 the beam is divided by W-W-DC, resulting in two separate beams traveling in respective waveguides 14 and 16 with a beam intensity of I/2. These two beams are further split by W-W-DC forming four separate beams traveling in waveguides 18, 22, 24, and 20 with intensity of I/4. When the proof mass 46 attached to waveguides 18 and 20 is accelerated with acceleration forces in the direction $\Delta F$ it will stress one waveguide in tension and the other in compression which changes the index of refraction of these photoelastic waveguides. This change increases the index in one waveguide and decreases the index in the other waveguide effectively increasing or decreasing the optical path length (OPL) of each waveguide in proportion to the amount of acceleration. Components of acceleration force that apply either compression or tension to both waveguides 18 and 20, simultaneously, do not contribute to measured data since these forces are effectively cancelled.

Light passing through waveguides 22 and 24, which are not stressed, passes through respective 90° phase bias elements 38 and 40 respectively. The laser energy in waveguide 22 is transfered to the output waveguide 26 and is added to the laser energy in waveguide 18 by way of W-W-DC. Before being detected by detector 34 the added beams pass through a horizontal polarizer 30 which assures the detection of beams polarized perpendicular to the stress direction. The purpose of the phase bias element 38 is to optimize the detection of small changes in acceleration. The electrical output of detector 34 is coupled to signal processor 42 which provides a differential input to the processor. The other differential input to signal processor 42 is similarly developed. Laser energy is coupled from polarizer 12 along path 16, divided into paths 20 and 24 and recombined in waveguide 28 before passing through polarizer 32 to detecter 36 which provides the other differential input to processor 42. These inputs are combined to provide a strong signal indicative of acceleration. When like forces such as compression are applied to both waveguides 18 and 20, the resultant electrical signals, when combined in processor 42, are cancelled. Therefore, only forces in the desired direction are measured.

In operation, laser 10, laser modulator 44 and signal processor 42 are energized, and voltage is supplied from power source 45 to the phase bias elements 38 and 40. This bias voltage provides a 90° phase lag for beams in waveguides 22 and 24 referenced to the beams in 18 and 20 respectively, when there is no input acceleration. The detection of small changes in acceleration can now be detected because the beams are separated by 90° which is the maximum slope point.

Only the components of acceleration that are parallel to the plane of the waveguides and perpendicular to the length of the waveguides (waveguide path) are effectively measured. In measuring these acceleration components waveguides 18 and 20 are differentially stressed causing a phase change between the beams of waveguides 18 and 22 and between the beams of waveguides 20 and 24. The resulting interference is detected by detectors 34 and 36 and is proportional to the acceleration. The phase change, $\Delta\phi$, in each output waveguide is:

$$\Delta\phi = \frac{\Delta n l}{\lambda} \quad (1)$$

$$\Delta n = \frac{B\Delta F}{A} = \frac{Bm\Delta a}{lw} \text{ and} \quad (2)$$

$$\Delta\phi = \frac{BM\Delta a}{w\lambda} \quad (3)$$

where
$\lambda$ = Wavelength of the laser source,
$\Delta\phi$ = Change in phase angle between two beams due to stress,
$\Delta n$ = Change in refraction index due to stress,
B = Sensor material constant, $10^{-13 m2}$/dyne (BREWSTERS),
$\Delta F$ = Change in force on proof mass due to acceleration,
A = Area of proof mass attached to waveguide,
| = Length of proof mass attached to waveguide,
w = Width of proof mass,
m = Proof mass, and
$\Delta a$ = Change in acceleration.

The equations for beam intensity at the detectors are:

$$I_0 = 2I_1 (1 + \cos \Delta\phi) \quad (4)$$

where
Beam 1 at detector 34 with intensity $I_1$ is equal to beam 2 at detector 36 with intensity $I_2$; $I_0$ is the intensity at the detectors.

Since there is a 90° phase lag between beams, $$I_0 = \frac{I}{2}[1 + \cos(\Delta\phi - 90°] = \frac{I}{2}(1 + \sin\Delta\phi), \quad (5)$$

where $I_1 = I_2 = I/4$, and I is the input laser intensity. The signal input to signal processor 42 from detector 34 may be $$S_a = \frac{I}{2}(1 + \sin\Delta\phi),$$

and the signal input from detector 36 may be $$S_b = \frac{I}{2}(1 - \sin\Delta\phi)$$

when the acceleration $\Delta F$ is in one direction. For acceleration forces in the opposite direction only the signs (+ or −) will change.

If the two signals are normalized and differenced the output from the signal processor is $$\frac{S_a - S_b}{S_a + S_b} = \sin\Delta\phi,$$

which is proportional to the input acceleration.

For a monolithic accelerometer structure where the sensitivity would be very high, a typical example may be:

$\lambda = 1 \times 10^{-4}$ cm $B = 160 \times 10^{-13}$ cm$^2$/dyne (GaAs)

m = 10 grams w = $4 \times 10^{-3}$ cm g = 980 cm/sec$^2$ (force of gravity)

$\mu g = 10^{-6} g$

Then using equation (3) the sensitivity (S) is $$S = \frac{\Delta\phi}{\Delta a} = \frac{Bm}{w\lambda} = 1.4 \times 10^{-4} \frac{deg}{\mu g}$$

Figure 3:
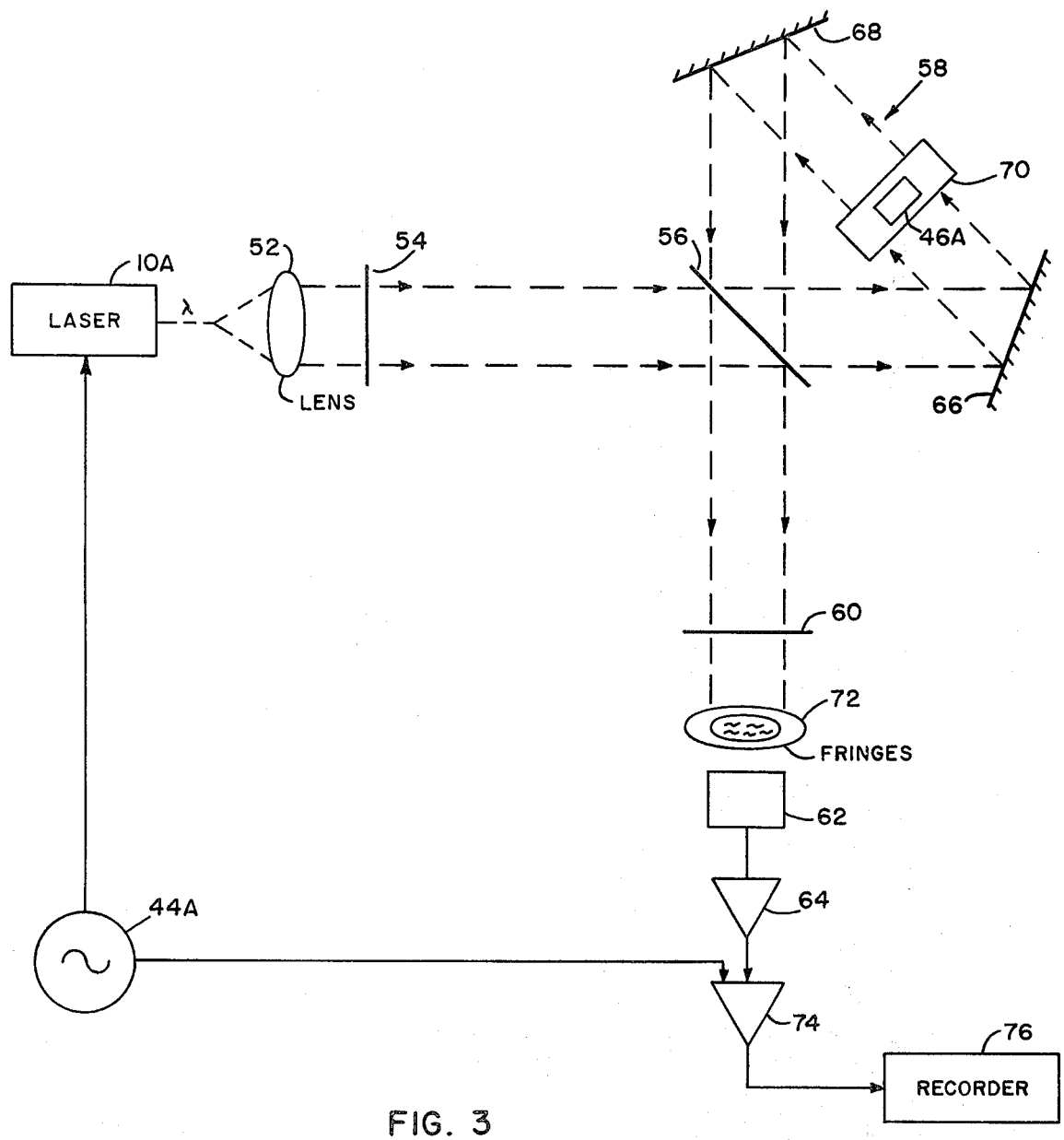
FIG. 3 is an alternative embodiment of the phase detection accelerometer using discrete components.

An alternative embodiment of the invention using discrete components is shown in schematic form in FIG. 3 wherein a laser 10A is disposed for directing a beam through a lens 52 and then through a polarizer 54 to a beamsplitter 56. Energy from beamsplitter 56 is directed along a first, closed, path to a photoelastic waveguide 58 and back from waveguide 58 to the beamsplitter. A polarizer 60 is disposed to receive all laser energy coming from the beamsplitter along a second path. This energy is coupled to photodetector 62 converted to an electronic signal and is subsequently detected by an operational amplifier 64.

Photoelastic waveguide 58 comprises an optical path between two mirrors 66 and 68. A photoelastic sensor material 70 is disposed in the optical path between the mirrors. A proof mass 46A is mounted on sensor material 70 and responds to acceleration forces to stress the material.

In operation laser 10A is energized and modulated by a laser modulator 44A to produce a laser beam with output wavelength which is directed or guided to lens 52 and subsequently polarized by polarizer 54. The polarized beam is coupled along two paths by beamsplitter 56. The first path from beamsplitter 56 is through closed path waveguide 20 along the path of mirror 66, photoelastic material 70, mirror 68, back to beamsplitter 56 and then to polarizer 60. The second path from beamsplitter 56 is directly through polarizer 60 and photodetector diode 62 into operational amplifier 64. An interference condition is established with the beam portion that is passed directly to polarizer 60 from beamsplitter 56, as is indicated by fringe 72. When proof mass 46A is accelerated it will stress the photoelastic material 44 and cause a phase difference between the two beams. The detector will detect the phase change and provide an output proportional to the input acceleration.

The measuring beam in the closed path 58 experiences a change in its optical path length when acceleration forces act on proof mass 46A stressing the photoelastic material 70. The change in optical path length produces a phase change $\Delta\phi$ between the measuring beam and the reference beam. Both beams pass through beamsplitter 56 where the interference condition is established similar to fringes 54. Polarizers 54 and 60 ensure that the beams are polarized perpendicular to the stress direction in the photoelastic material 70 since the greatest change in index of refraction is established in this direction. The art of detecting interference fringes is well established and is normally accomplished using circuitry such as photodetector 62 with an amplifier 64 whose output is fed to a signal processor or lock-in differential amplifier 74 which produces the desired output to be monitored or recorded, such as by a recorder 76 or inputed to a digital computer.

In an integrated optics format as shown in FIG. 1, the polarizer can be made of a simple grating structure etched in the substrate or simple parallel metal plates deposited along the waveguide. The electro-optic phase modulator is an active element that changes the index of refraction in proportion to an applied voltage thus changing the effective optical path length. The most straight forward electrooptic modulation of a guided-wave mode produces a phase retardation as the mode propagates through an electrically induced birefringent medium. The phase modulation can be obtained by propagating a mode with a propagation in the desired direction and applying an electric field orthogonal thereto.

The primary goal of integrated optics is to integrate a variety of discrete optical elements, both active and passive, into a monolithic, miniaturized planar structure. It is an optical analogy of integrated circuit technology in the electronics industries. By this analogy, it is reasonable to assume that optical systems in the integrated optics configuration can be made more efficient, compact and stable at lower cost. In the embodiment shown in FIG. 1, which is a monolithic structure, gallium-aluminum-arsenide is used as the substrate. Other substrates may be resorted to such as silicon or lithium-niobate, however, in this structure an interface must be used between the laser and the substrates and the detectors.

Obviously many modifications and variations of the present invention are possible in the light of the above teachings. It is therefore to be understood that within the scope of the appended claims the invention may be practiced otherwise then as specifically described.

I claim:

1. A phase detection laser accelerometer comprising: a laser for generating a beam of coherent light, polarizing means disposed in the path of said beam of light for providing a polarized light beam output, first and second photodetectors, optical waveguide means made of a material having a refractive index that changes in response to stress for passing coherent light therethrough and for splitting and directing said polarized light beam into a plurality of beams, a proof mass disposed on said waveguide means for selectively stressing portions of the waveguide means in response to acceleration acting on the proof mass, first and second of said beams being directed through said waveguide means as inputs to said first and second photo-detectors respectively, third and fourth of said beams being directed through said waveguide means to said first and second photodetectors respectively, said first and third beams being coincident and said second and fourth beams being coincident at said detectors, and signal processing means adapted to receive inputs from said photodetectors for providing a difference signal output in response to acceleration forces on said proof mass.

2. A phase detection laser accelerometer as set forth in claim 1 wherein said waveguide means is an integrated optical circuit having at least first, second, third, and fourth optical paths for carrying said first, second, third, and fourth beams respectively therein for dividing the input optical signal equally therebetween.

3. A phase detector laser accelerometer as set forth in claim 2 wherein said proof mass is a solid mass having first and second legs positioned on said first and fourth optical paths for applying tension to one path and compression to the other path in response to selectable acceleration forces applied to said proof mass.

4. A phase detection laser accelerometer comprising: a laser for generating a beam of coherent light; polarizing means disposed in the path of said beam of light for providing a polarized light beam output; a photodetector, optical waveguide means made of a material having a refractive index that changes in response to stress for passing coherent light therethrough; a beamsplitter disposed adjacent said polarizing means for dividing said polarized beam into first and second beam paths, said first beam path being through said waveguide means and back through said beamsplitter to said detector, said second path being directly to said detector and thereby providing an optical interference pattern input to the detector; a proof mass disposed adjacent said waveguide means for stressing said waveguide in response to acceleration forces on said proof mass said detector detecting changes in said interference pattern in response to acceleration forces.

5. An accelerometer as set forth in claim 4 and further comprising a second polarizer disposed between said beamsplitter and said photodetector, and recording means responsive to said photodetector for indicating acceleration stresses sensed by said detector.

6. An accelerometer as set forth in claim 5 wherein said waveguide means comprises a photoelastic material disposed between an input mirror and an output mirror for directing optical energy therethrough, said proof mass being disposed on said photoelastic material.

* * * * *